United States Patent [19]
Hurst, Jr.

[11] Patent Number: 6,034,731
[45] Date of Patent: Mar. 7, 2000

[54] MPEG FRAME PROCESSING METHOD AND APPARATUS

[75] Inventor: Robert Norman Hurst, Jr., Hopewell, N.J.

[73] Assignee: Sarnoff Corporation, Princeton, N.J.

[21] Appl. No.: 08/910,196

[22] Filed: Aug. 13, 1997

[51] Int. Cl.[7] .............................. H04N 5/783; H04N 7/32
[52] U.S. Cl. .................. 348/423; 348/461; 348/513; 348/845.2; 348/845.3; 386/111; 386/112
[58] Field of Search ..................... 348/384–440, 348/461, 500, 513, 515, 526, 845.2, 845.3, 845.1, 411, 464; 375/372; 386/111, 112

[56] References Cited

U.S. PATENT DOCUMENTS

| | | | |
|---|---|---|---|
| 4,315,331 | 2/1982 | Lemoine | 358/127 |
| 5,473,385 | 12/1995 | Leske | 348/500 |
| 5,703,877 | 12/1997 | Nuber | 348/423 |
| 5,731,839 | 3/1998 | Panaro | 348/416 |
| 5,731,850 | 3/1998 | Maturi | 348/699 |
| 5,737,531 | 4/1998 | Ehley | 395/200.38 |
| 5,739,860 | 4/1998 | Hoshino | 348/411 |
| 5,751,773 | 5/1998 | Campana | 375/346 |
| 5,754,241 | 5/1998 | Okada | 348/419 |
| 5,793,927 | 8/1998 | Lane | 348/423 |
| 5,815,634 | 9/1998 | Daum | 386/96 |
| 5,937,138 | 8/1999 | Fuduka | 386/111 |

*Primary Examiner*—John K. Peng
*Assistant Examiner*—Wesner Sajous
*Attorney, Agent, or Firm*—William J. Burke

[57] ABSTRACT

The invention is a method and apparatus for processing an MPEG-like bitstream comprising information frames having associated timing parameters. The method and apparatus identify one or more non-referential information frames containing at least a threshold number of bits, remove one or more of the identified non-referential information frames and modify the timing information associated with each information frame following the one or more removed information frames.

32 Claims, 5 Drawing Sheets

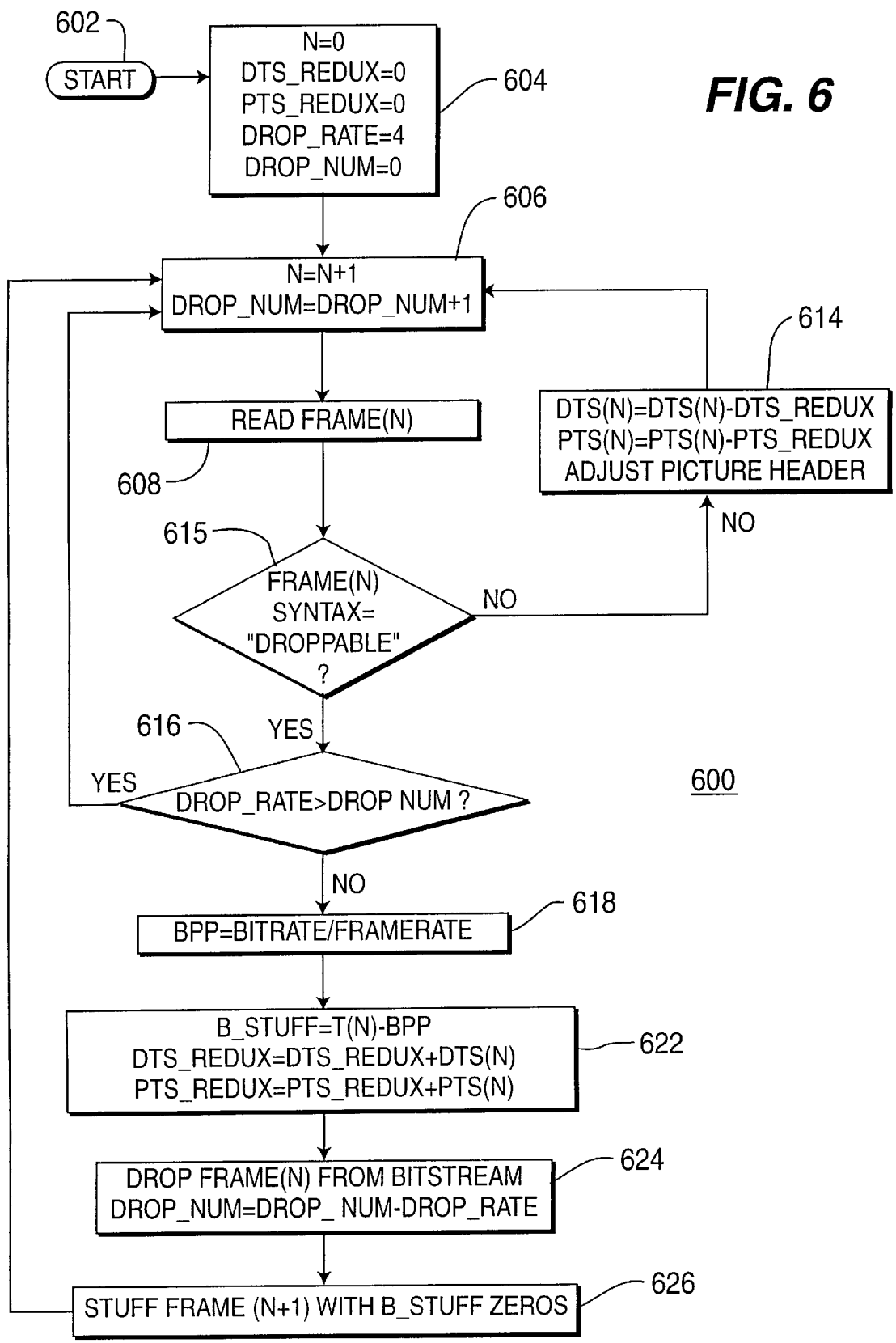

MPEG FRAME PROCESSING METHOD AND APPARATUS

This invention was made under U.S. Government Contract 14940 70NANB5H1174. The Government has certain rights in the invention.

The invention relates to communication systems in general and, more particularly, the invention relates to information frame processing in an MPEG-like information stream.

BACKGROUND OF THE DISCLOSURE

Television broadcasters use various time compression techniques to maximize the amount of available advertising time within a particular time period. One such technique is speeding up the playback of a taped production by playing the tape faster than normal. For example, a 3% increase in playback speed of a 30 minute syndicated television program provides a 60 second increase in the amount of time available for advertising. The visual impact of the tape speed increase is not readily discernible to the average viewer.

The above technique may be implemented by coupling the output signal from an accelerated tape player to a frame synchronizer, illustratively a first-in, first-out (FIFO) memory which is read at a normal rate. Eventually the FIFO fills up and a field or frame of video is discarded (i.e., "dropped").

The Moving Pictures Experts Group (MPEG) has promulgated several standards relating to digital data delivery systems. The first, known as MPEG-1 refers to ISO/IEC standards 11172, incorporated herein by reference. The second, known as MPEG-2, refers to ISO/IEC standards 13818, incorporated herein by reference. A compressed digital video system is described in the Advanced Television Systems Committee (ATSC) digital television standard document A/53, incorporated herein by reference.

It is seen to be desirable to perform a speedup or similar function in an MPEG or ATSC environment such that additional advertising time may be utilized by, e.g., television broadcast and cable companies. Current practice for performing a speedup operation on bitstreams simply involves decoding the bitstream, running the decoded bitstream through a Frame Sync (which drops frames as appropriate), and then re-encoding the stream into MPEG form. Unfortunately, removing bits from the bitstream changes a number of bitstream parameters, including the number of bits in the bitstream. These changes may produce undesirable MPEG or ATSC non-conformities, such as buffer synchronization disruption, video buffering verifier (VBV) overflow and VBV underflow.

Therefore, a need exists in the art for a method and apparatus for performing speedup or similar function in an MPEG or ATSC environment without causing undesirable MPEG or ATSC non-conformities.

SUMMARY OF THE INVENTION

The invention is a method and apparatus for processing an MPEG-like bitstream comprising information frames having associated timing parameters. The method and apparatus identify one or more non-referential information frames containing at least a threshold number of bits, remove one or more of the identified non-referential information frames and modify the timing information associated with each information frame following the one or more removed information frames. The invention synchronizes a VBV trajectory of the frame processed bitstream to the VBV trajectory of the (unprocessed) input bitstream to preserve the MPEG or ATSC compliance built into the input bitstream.

BRIEF DESCRIPTION OF THE DRAWINGS

The teachings of the present invention can be readily understood by considering the following detailed description in conjunction with the accompanying drawings, in which:

FIG. 6 is a flowchart of an adjustable rate, frame dropping routine according to the invention.

To facilitate understanding, identical reference numerals have been used, where possible, to designate identical elements that are common to the figures.

DETAILED DESCRIPTION

Figure 1:
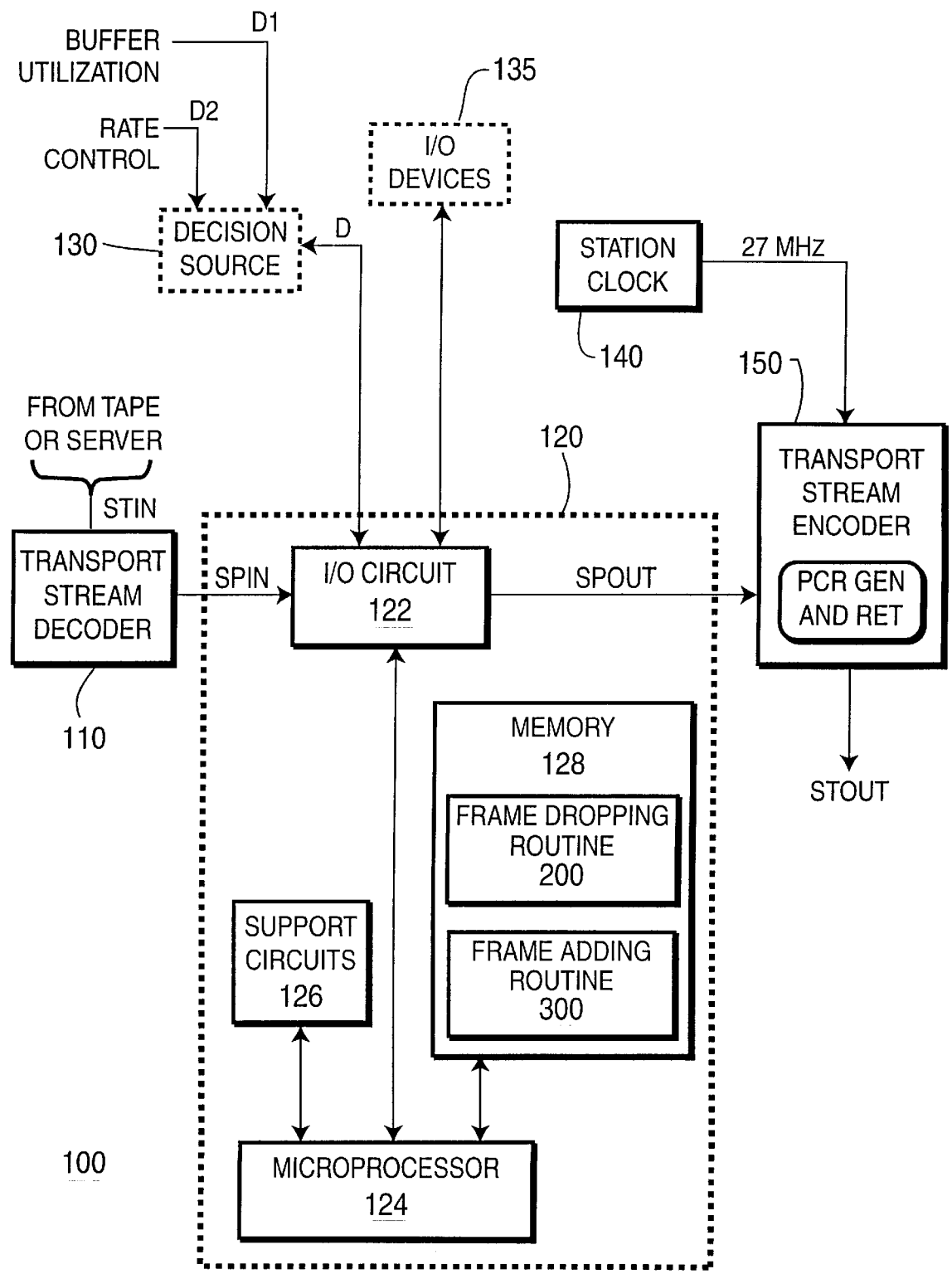
FIG. 1 shows a block diagram of an information processing system including a frame processor according to the invention.

FIG. 1 shows a block diagram of an information processing system 100 including a frame processor 120 according to the invention. The system 100 contains a transport stream decoder 110, a frame processor 120, an optional decision source 130, I/O devices 135, transport stream encoder 150 and a station clock 140. The transport stream decoder 110 decodes an input transport stream STIN, illustratively an MPEG stream, in a known manner to produce a program input stream SPIN. The program input stream SPIN comprises one or more packetized elementary streams (PES), including at least one video PES.

The frame processor 120 is coupled to the transport stream decoder 110 and processes the program input stream SPIN by selectively dropping or adding video frames from the video PES stream to produce a program output stream SPOUT. By dropping video frames at a predetermined rate, the runtime of a decoded video sequence (i.e., program) can be reduced by a predetermined percentage. Audio PES streams associated with the video PES stream are also processed to retain visual and aural synchronization (i.e., "lip-sync").

In the case where a fixed drop rate is undesirable, an optional decision source 130 communicates with the frame processor 120 via a decision control path D. The decision source 130 may comprise a director's control panel, a buffer synchronizer, or any other source of control. By varying a "drop rate," the runtime of the decoded video sequence may be reduced to a greater or lesser extent. By also varying an "add rate," the runtime of the decoded video sequence may be controllably increased or decreased. A decision to add or drop frames may be based upon a rate control signal D2 or a desired change in the number of frames in the receiver circuitry over time. Thus, the decision source may be used to maintain appropriate levels of buffer utilization throughout the communications channel by causing the frame processor to drop or add frames in response to an indicium of buffer utilization D1. In this manner, overflow or underflow errors in a far-end, e.g., television receiver, decoder buffer may be avoided. It should be noted that the frame processor performs frame-drop and frame-add operations in an MPEG compliant manner. Thus, the indicium of buffer utilization will be indicative of utilization factors beyond the frame processor.

The transport stream encoder (TSE) 150 is coupled to the frame processor 120 and receives the processed video stream SPOUT. The TSE 150 encodes the stream in a known manner to produce an output transport stream STOUT. TSE 150 includes a PCR generator and retimer which receives a 27 MHz clock signal from a station clock 140, and performs PCR re-stamping of the output transport stream STOUT. The PCR re-stamping process is necessary to maintain receiver timing synchronization.

The frame processor 120 contains a microprocessor 124 as well as memory 128 for storing a frame dropping routine 200 and an optional frame adding routine 300. The microprocessor 124 cooperates with conventional support circuitry 126 such as power supplies, clock circuits, cache memory and the like as well as circuits that assist in executing the software routines. As such, it is contemplated that some of the process steps discussed herein as software processes may be implemented within hardware, e.g., as circuitry that cooperates with the microprocessor 124 to perform various steps. The frame processor 120 also contains input/output circuitry 122 that forms an interface between conventional input/output (I/O) devices 135, such as a keyboard, mouse, and display as well as an interface to a bitstream source (e.g., TSD 110) and a bitstream destination (e.g., TSE 150). Although the frame processor 120 is depicted as a general purpose computer that is programmed to control frame dropping and, optionally, frame adding in accordance with the present invention, the invention can be implemented in hardware as an application specific integrated circuit (ASIC). As such, the process steps described herein are intended to be broadly interpreted as being equivalently performed by software, hardware, or a combination thereof.

The frame processor 120 of the present invention executes a frame dropping routine 200 that removes certain frames of video from an MPEG-like bitstream. The bitstream may comprise an elementary stream, a packetized elementary stream (PES), a transport stream or a program stream. Moreover, the bitstream may comprise a constant bitrate (CBR) or variable bitrate (VBR) stream. Finally, the invention may optionally be used to add frames to the bitstream.

The inventor has determined that two criteria must be satisfied before a frame may be dropped from the bitstream. First, the frame to be dropped must be a non-referential frame, i.e., the frame must not be used to predict other frames. MPEG utilizes intra-frame (I-frame), forward prediction (P-frame) and bi-directional prediction (B-frame) frame types. I-frames and P-frames are often referred to by other frames, so dropping those referential frames may cause a decoding error. B-frames are never used as a reference for any other frames. In addition to B-frames, P-frames that are not referred to by other frames may also be dropped, e.g., a P-frame followed by any number of B-frames and I-frame (in bitstream order).

The second criterion is that the frame to be dropped must contain at least as many bits as will enter a decoder video buffer before the next picture is decoded. The following discussion clarifies the second criterion. The discussion is directed towards a packetized elementary stream (PES) frame processing method.

An elementary MPEG bitstream comprises a sequence of information frames, such as video, audio and auxiliary data frames. The number of bits in a frame N (i.e., the $N^{th}$ frame) in the bitstream is $T_N$. An MPEG picture header contains a VBV delay number indicative of the amount of time a decoder should wait after the picture header enters the decoder's VBV buffer before decoding the picture. Therefore, frame N of the elementary stream has an associated VBV_DELAY(N). When an elementary stream frame is dropped the VBV delay parameter associated with the next frame (i.e., the $N^{th}+1$ frame) must be adjusted to equal the VBV delay parameter of frame N. The VBV delay value for picture N must be substituted into the picture header for the VBV delay value of picture N+1. This may be described mathematically as VBV_DELAY(N+1)=VBV_DELAY(N). All subsequent VBV_DELAY values will be correct, since the stuffing process described below and the bitstream constraint guarantee VBV buffer synchronization.

A packetized elementary stream (PES) is essentially an elementary stream with an extra header applied to it. The PES header contains a Decode Time Stamp (DTS) indicative of when the frame should be removed from a decoder buffer and decoded. The PES header also contains a Presentation Time Stamp (PTS) indicative of when the decoded frame should be presented to the video (or audio) processing unit of the decoder. Therefore, frame N of the packetized elementary stream has an associated VBV_DELAY(N), DTS(N) and PTS(N). When a PES stream frame is dropped, the VBV delay parameter of the next frame (N+1) must be adjusted. In addition, the DTS and PTS associated with each frame following the dropped frame must be adjusted.

An MPEG compliant transport stream is a constant bitrate stream comprising one or more PES streams and/or elementary streams. The transport packets contain timing reference information in the form of a Program Clock Reference (PCR) which appears at least 10 times each second in so-called reference packets in the transport stream. The PCR is a sample of the 27 Mhz clock used to encode the transport stream, and is used to recover the encoder clock at a decoder. When a frame is dropped from a transport stream, the PCRs following the dropped frame will be incorrect and must be adjusted, much like the VBV_DELAY, PTS and DTS values. However, the PCR is adjusted by comparing the incoming PCRs to a local PCR counter. At any given time after the first frame drop, the local clock value for the PCR is used to replace whatever value is found when a PCR reference packet is received. Alternatively, the local PCR may be constantly used to re-stamp all the PCR values in the stream, thereby assuring correct PCRs in the output stream.

The behavior of a decoder buffer will now be described with respect to a PES stream. Associated with a frame N in a PES stream is a decode time stamp DTS(N) and a presentation time stamp PTS(N). The next frame (in bitstream order) is a frame N+1. The frame N+1 comprises a number of bits $T_{N+1}$. The frame N+1 is decoded by the decoder at a time indicated by a decode time stamp DTS (N+1) and presented by the decoder at a time indicated by a presentation time stamp PTS(N+1), assuming each picture includes a DTS and PTS.

Prior to decoding frame N, i.e., prior to DTS(N), a VBV contains $B_{START}$ bits. $B_{PP}$ bits enter the VBV buffer between decoding time of frame N and the decoding time of frame N+1, i.e., between DTS(N) and DTS(N+1). After frame N+1 is decoded, the VBV contains $B_{END}$ bits.

It is important to ensure that the VBV behavior of a bitstream does not change due to the processing (e.g., frame dropping or frame adding) of the bitstream. This is because the VBV behavior of the unprocessed bitstream (e.g., STIN)

is presumed to be MPEG or ATSC compliant and, therefore, should not cause errors in the decoder. Thus, if the VBV behavior of the processed bitstream is substantially the same as the VBV behavior of the unprocessed bitstream, then the processed bitstream will also be MPEG or ATSC compliant. The invention synchronizes the VBV "trajectory" of the frame processed bitstream to the VBV trajectory of the (unprocessed) input bitstream to preserve the MPEG or ATSC compliance built into the input bitstream.

In the case of "field" dropping (or adding), the frame processor is adapted to process both fields forming an individual frame. Single fields are not dropped or added, only field pairs (i.e., frames) are dropped or added. The term "frame" as used herein is also used to denote a pair of fields representing a single frame.

Figure 4:
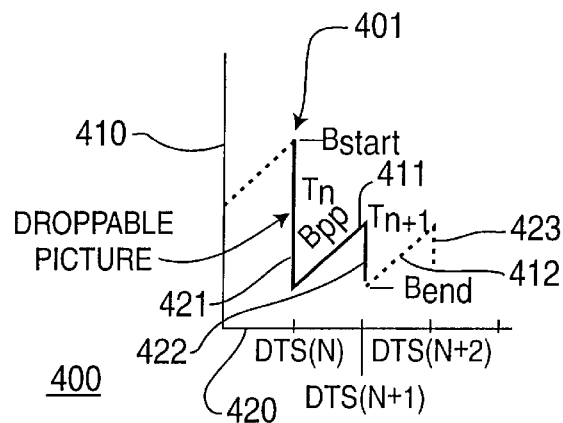
FIG. 4 is a graphical representation of a VBV trajectory of a decoded bitstream useful in understanding the invention.

FIG. 4 is a graphical representation of a VBV trajectory 401 of a decoded bitstream useful in understanding the invention. The VBV trajectory 401 is the decoder buffer or VBV utilization 410 as a function of decode time 420. At decode time DTS(N), the $N^{th}$ frame is removed from the VBV and the number of VBV bits drops from $B_{START}$ to $B_{START} - T_N$ as represented by portion 421 of trajectory 401. Between DTS(N) and DTS(N+1) the number of bits increases by $B_{PP}$ (portion 411). At decode time DTS(N+1), the $N^{th}+1$ frame is removed from the VBV and the number of VBV bits drops to $B_{END}$ (portion 422). If the bitstream causing the VBV trajectory is MPEG or ATSC compliant, then a frame-processed bitstream having the same trajectory will also be DPEG or ATSC compliant.

To maintain VBV buffer synchronization after removing a frame N from the bitstream, the same number of bits $B_{END}$ must remain in the buffer after picture N+1 is decoded. If a frame is not dropped, then $B_{END}$ may be calculated using equation 1. If a frame N is dropped, then $B_{END}$ may be calculated using equation 2, where $B_{STUFF}$ represents the number of zeros stuffed into frame N+1 to ensure that the frame-processed bitstream contains the same number of bits and the original bitstream.

$$B_{END} = B_{START} - T_N + B_{PP} - T_{N+1} \quad (eq. 1)$$

$$B_{END} = B_{START} - T_{N+1} - B_{STUFF} \quad (eq. 2)$$

Equating the above equations for $B_{END}$ (the requirement for buffer synchronization) results in the equation 3, which reduces to equation 4:

$$B_{START} - T_N + B_{PP} - T_{N+1} = B_{START} - T_{N+1} - B_{STUFF} \quad (eq. 3)$$

$$B_{STUFF} = T_N - B_{PP} \quad (eq. 4)$$

$B_{STUFF}$ must be greater than or equal to zero. The stuffing bits ensure that the VBV synchronization is maintained and that the bitcount in a constant bitrate system (e.g., transport stream communication channels) is maintained. In a variable bitrate system, it may not be necessary to add stuffing bits.

In the case of PES streams, dropping a frame N creates a discontinuity in the DTS sequence and a similar discontinuity in the PTS sequence of the frames following frame N (in bitstream order). For example, in a 30 frames per second sequence, the DTS increments by 3000 each picture: e.g., 0000, 3000, 6000, 9000, and so on. If the frame N to be dropped is the second frame (i.e., DTS(N)=6000), then the DTS sequence would become 0000, 6000, 9000, 12000 (and so on) and a DTS discontinuity would exist between DTS (N−1) and DTS(N+1). To resolve the discontinuity, the frames following the dropped frame must have their DTSs modified to compensate for the discontinuity. Thus, DTS (N+1)=DTS(N+1)-DTS(N)=6000−3000=3000; DTS(N+2)= DTS(N+2)-DTS(N)=9000−3000=6000; and so on. The DTS of all frames following the dropped frame must be djusted in this manner. Moreover, any subsequent frame drops will increase the amount of adjustment required. It should be noted that the PTS in the PES header, and the VBV delay parameter in the picture header, of all frames following the dropped frame must also be adjusted. The PTS may be adjusted in the same manner as the DTS. The VBV delay parameter in the picture header of the dropped frame may be substituted into picture header of the frame following the dropped frame. The VBV delay parameters of all subsequent frames will be accurate due to the stuffing process.

In the case of transport streams, dropping a frame N creates the above described discontinuities to the VBV delay, DTS and PTS parameters. The PCRs should also be re-stamped by a transport stream encoder to ensure MPEG compliance of the processed stream.

Figure 5:
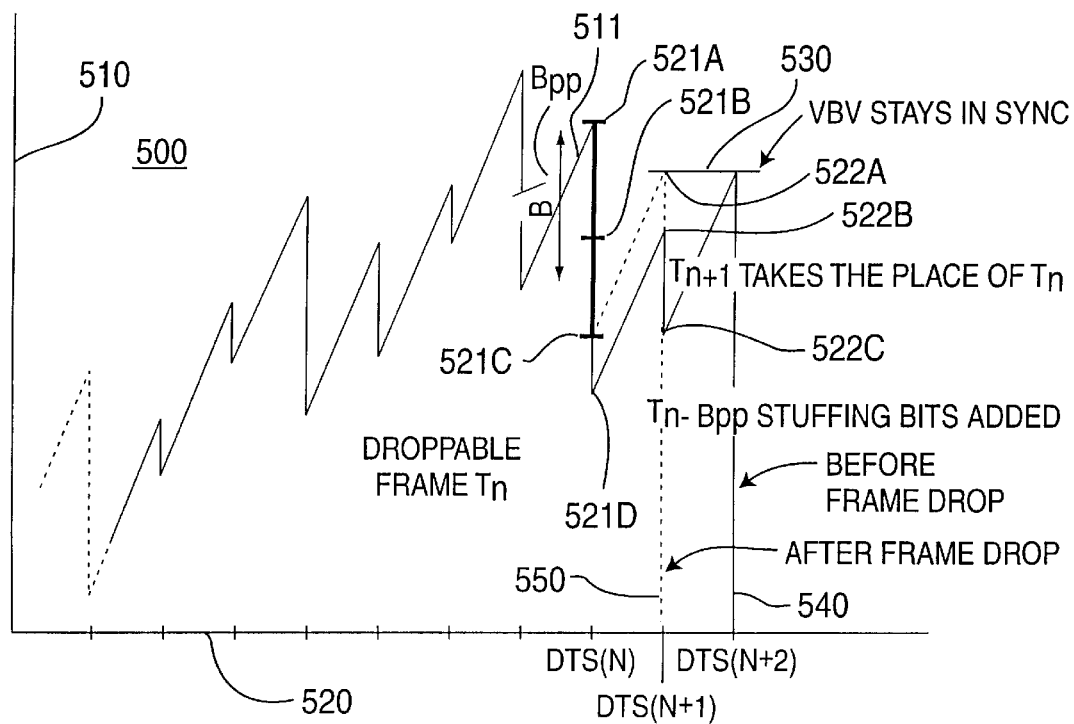
FIG. 5 is a graphical representation of a VBV trajectory of a decoded bitstream including a VBV trajectory of a frame processed bitstream superimposed over a VBV trajectory of the unprocessed bitstream.

FIG. 5 is a graphical representation of a VBV trajectory 500 of a decoded bitstream including a VBV trajectory 550 of a frame processed bitstream (dotted line) superimposed over a VBV trajectory 540 of the unprocessed bitstream (solid line). The frame processing method 200 of FIG. 2 (discussed below) was used to process the bitstream causing the VBV trajectory denoted as 550 in FIG. 5. The description of common portions in both FIG. 4 and FIG. 5 will not be repeated.

The two VBV trajectories 540, 550 are the same up until the $N^{th}$ frame, which has been dropped. The unprocessed VBV trajectory 540 drops to a bit level shown as 521D, whereas the processed VBV trajectory 550 drops to a bit level shown as 521C. The difference between the two bit levels is the number of bits $T_N$ in the dropped $N^{th}$ frame. To compensate for the dropped $N^{th}$ frame, $T_N - B_{PP}$ stuffing bits have been added to $N^{th}+1$ frame. In addition, the DTS, PTS and VBV delay parameter of the $N^{th}+1$ frame have been adjusted as described above and with respect to FIG. 2. The original trajectory ending number of bits BEND is shown as 522C. The new trajectory (after the frame drop) ending number of bits $B_{END}$ is shown as 521C. Since $B_{END}$ is the same for both trajectories the VBV level for both trajectories must correspond, as shown at 530. It is important to note that the two VBV trajectories 540 and 550 converge at a bit level denoted as 530 at the time DTS(N+2). Thus, the VBV trajectories have been synchronized.

Figure 2:
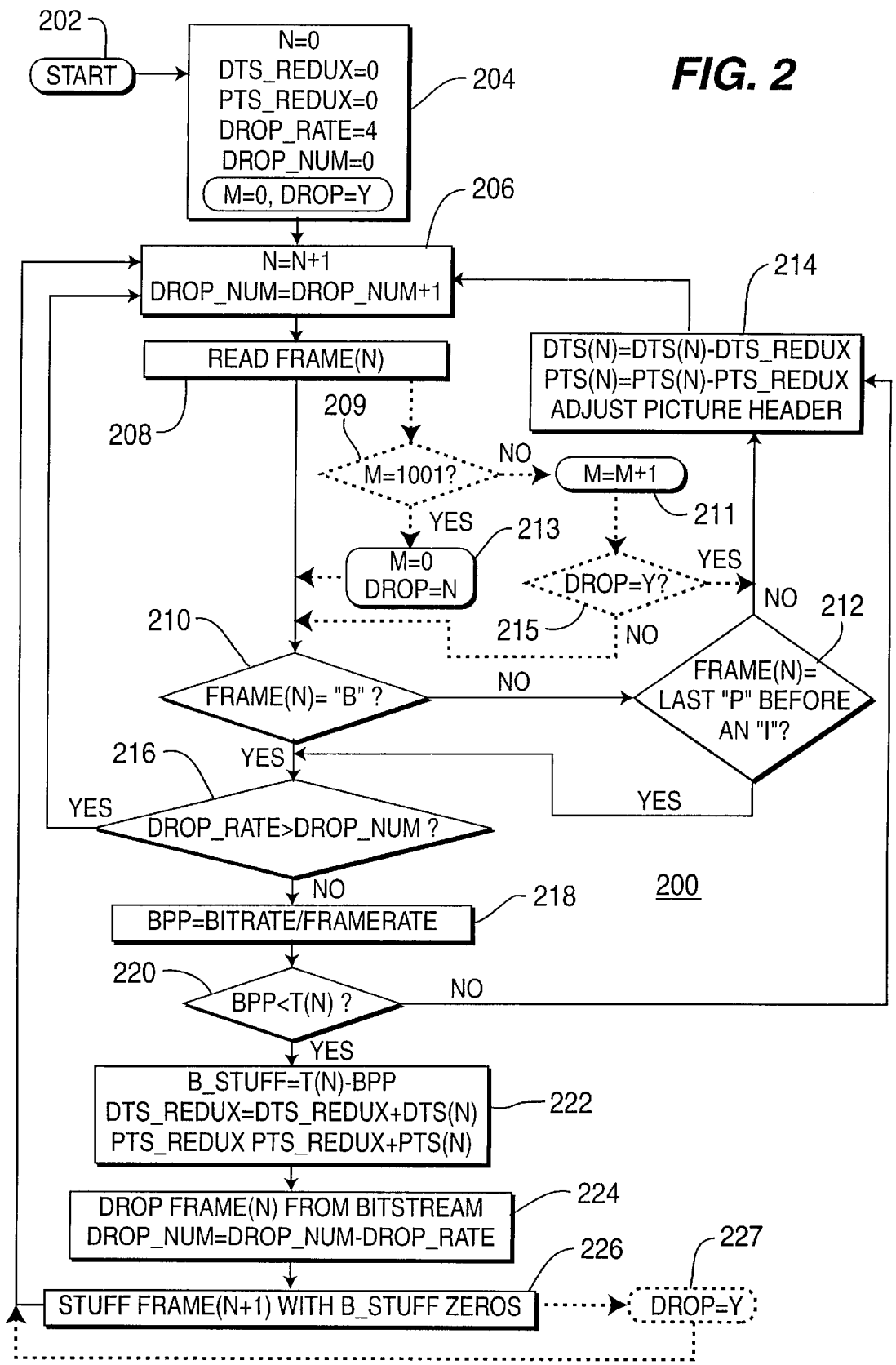
FIG. 2 is a flowchart of an adjustable rate, frame dropping routine according to the invention.

FIG. 2 is a flowchart of an adjustable rate, frame dropping routine 200 according to the invention. The routine reads each video frame in a video stream, determines which frames are "droppable" and drops some or all of the droppable frames. The routine also modifies timing information in frames following (in bitstream order) the dropped frame or frames to avoid buffer overflow and underflow at a decoder receiving the processed stream. The routine will be described as operating upon a PES stream.

The routine 200 is entered at step 202. Several variables are initialized at step 204. A frame index or pointer (N) is initialized to zero. In addition, a DTS reduction variable (DTS_REDOX) and a PTS reduction variable (PTS_REDUX) are initialized to zero. The DTS and PTS reduction variables are used to accumulate the DTS and PTS errors due to frame drops so that these errors may be corrected by recalculating the DTS and PTS parameters of frames following the dropped frame(s). A drop rate (DROP_RATE) is initialized to four, indicating that every fourth droppable frame should be dropped. The drop rate may be predetermined or may be modified by, e.g., the decision source 130 of FIG. 1. A droppable frame counter (DROP_NUM) is also initialized to zero. Optionally, a frame counter M is initialized to zero.

The frame index and drop number are incremented in step 206 and the $N^{th}$ frame is read in a known manner in step 208. If frame(N) is a B-frame (step 210) or the last P-frame before an I-frame (step 212), then frame(N) satisfies the first criterion for being droppable.

At step 208, the header of the frame (N) is inspected to determine the frame type, e.g., B-, P- or I-frame. Step 210 queries whether frame (N) is a B type frame. If the query at step 210 is negatively answered, the routine 200 proceeds to step 212. At step 212, the routine queries whether frame (N) is a P-type frame and, if so, whether frame(N) is the last P-type frame prior to the next I-type frame. If the query is answered negatively, the routine 200 proceeds to step 214. If the query at step 210 or step 212 is affirmatively answered, the routine 200 proceeds along a YES path to step 216.

Step 216 queries whether the drop rate variable (DROP_RATE) is greater than, or equal to, the drop number (DROP_NUM) variable. If the answer to this query is affirmatively answered (i.e., if frame(N) is not at least the fourth droppable frame since the last frame drop) then the routine 200 proceeds along the YES path to step 206. If the query at step 216 is negatively answered, then the routine 200 proceeds to step 218.

At step 218 the number of bits ($B_{PP}$) added to the decoder buffer between DTS(N) and DTS(N+1) is calculated by dividing the bitrate of the bitstream (BITRATE) by the frame rate (FRAMERATE) of the bitstream. For example, in a 30 frames per second, 10 Mbit per second bitstream, the number of bits Bpp is 10,000,000/30 or 333,3333 bits.

Step 220 queries whether the number of bits ($T_N$) in frame(N) is less than $B_{PP}$. If the query at step 220 is negatively answered, then the routine 200 proceeds along the NO path to step 214. If the query at step 220 is affirmatively answered then the routine 200 proceeds to step 222. If the number of bits ($T_N$) in frame(N) is greater than $B_{PP}$ (step 220), then frame(N) satisfies the second criterion for being droppable. For example, in a 30 frames per second, 10 Mbit per second bitstream, frame(N) must contain at least 333,333 bits to be droppable.

If frame(N) is not to be dropped, then the routine proceeds to step 214. At step 214 the PTS, DTS and picture header of frame(N) are adjusted to compensate for timing discontinuities caused by the dropping of any preceding frames. The routine then proceeds to step 206.

If frame(N) can be dropped (i.e., the first and second criterion are met) and should be dropped (i.e., at least the DROP_RATE$^{TH}$ droppable frame), then, at step 222 the routine 200 calculates a stuffing value (B_STUFF=$T_N$−$B_{PP}$) and adjusts the DTS and PTS reduction accumulators. At step 224, frame(N) is dropped and the drop number variable is reduced by the drop rate variable. Thereafter, at step 226, the routine stuffs frame(N+1) with the number of zeros calculated in step 222. The routine 200 then returns to step 206 to process another frame.

It should be noted that the drop number variable is not reset to zero. Rather, the drop number variable is decremented by the drop rate in step 224 and incremented by one in step 206. This is to ensure that the drop rate over an extended period of time is roughly equivalent to one frame dropped out of four droppable frames. For example, if frame(N) is sixth droppable frame since the previously dropped frame, then the next frame to be dropped should be the second droppable frame after frame(N). An undesirable situation arises where a large number of frames pass only the first criterion of droppability, thereby producing a very large drop number. In this undesirable situation, each one of a sequence of frames passing both criteria of droppability may then be dropped, thereby causing undesirable video or audio artifacts (e.g., a choppy picture and poor lip sync). To avoid this undesirable situation a smoothing algorithm (not shown) may be included in the routine 200 to produce a maximum drop rate of, e.g., one drop for every two droppable frames.

As previously noted, the frame processor 120 may be used to add one or more frames to a bitstream. Adding frames may accomplished by inserting a P-frame comprising uncoded macroblocks with zero magnitude motion vectors. Such a frame will act as a "repeat last frame" command in an MPEG-compliant syntactical manner. The added "dummy" frame is generated by the microprocessor 124 or stored in the memory 128 and inserted when necessary.

It is important to note that an added frame should contain $B_{PP}$ bits to facilitate simplified DTS, PTS and VBV delay recalculations. Since a P-frame comprising uncoded macroblocks with zero motion vectors requires very few bits, the P-frame needs to be stuffed prior to being added to the bitstream. Of course, in the constant bitrate case (e.g., a transport stream), the added frame must contain $B_{PP}$ bits.

The invention is also useful in frame conversion applications using optional steps 209, 211, 213, 215 and 227. For example, the invention may be used to convert a 60 frames per second (fps) video stream into a 59.94 fps video stream by dropping and average of one frame per 1001 frames. A frame counter M is initialized to zero and a drop indicator DROP is initialized to "Y" in step 204. Additionally, when performing a frame rate conversion, the DROP_RATE variable should be initialized to 1 so that the first droppable frame after the 1001$^{th}$ frame is, in fact, dropped.

When the frame rate conversion option is utilized, the routine reads the next frame (step 208) and proceeds to step 209 instead of step 210. The contents of the frame counter are queried at optional step 209 to see if the most recently read frame (i.e., the No frame) is the 1001$^{th}$ frame.

If the query at step 209 is answered affirmatively, then the routine 200 proceeds to step 213, where the frame counter M is set to zero and the frame drop indicator is set to "N". The routine 200 next proceeds through steps 210 to 226 as previously described. If the frame N is dropped then, at step 227, the drop indicator is set to "Y". The routine 200 then proceeds to step 206.

If the query at step 209 is answered negatively, then the routine 200 proceeds to step 211, where the frame counter M is incremented. The routine 200 next proceeds to step 215, where the setting of the drop indicator is queried. If the drop indicator is set to "N", thereby indicating that at least 1001 frames have been read without dropping a frame, then the routine 200 proceeds to step 210. If, at step 215, the drop indicator is set to "Y", thereby indicating that a frame does not need to be dropped at this time, the routine 200 proceeds to step 214. The drop indicator DROP is used to ensure that one frame is dropped for every 1001 frames read.

It should be noted that frame rate conversions other than the exemplary 60 fps to 59.94 fps may be effected by changing the number that M is compared to in step 209.

Figure 3:
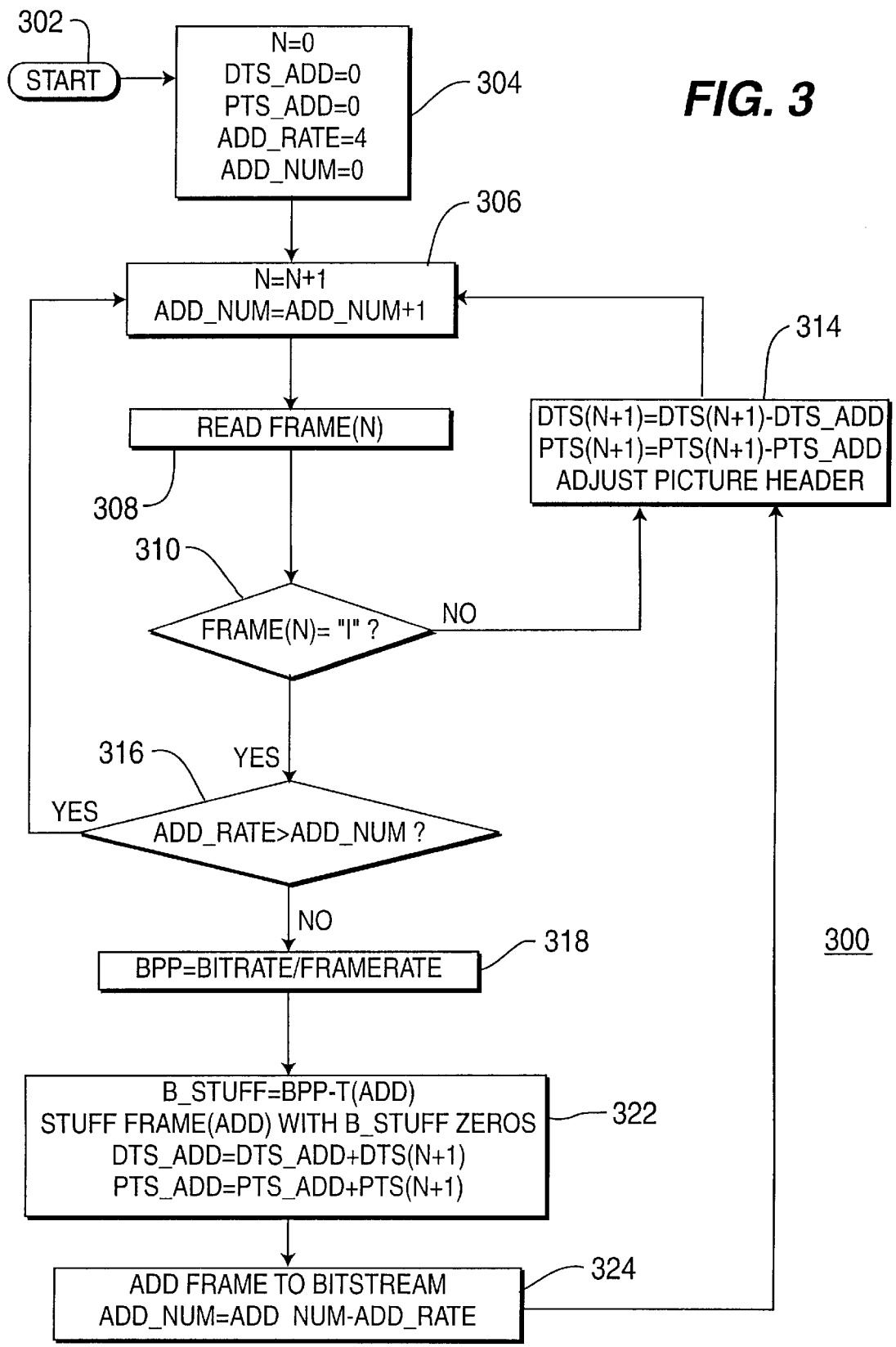
FIG. 3 is a flowchart of an adjustable rate, frame adding routine according to the invention.

FIG. 3 is a flowchart of an adjustable rate, frame adding routine 300 according to the invention. The routine 300 reads each video frame in a video stream, determines which frames are I-frames and adds a frame after some or all of the I-frames. The routine also modifies timing information in frames following (in bitstream order) the added frame or frames to avoid buffer overflow and underflow at a decoder receiving the processed stream. The routine will be described as operating upon a PES stream.

The routine 300 is entered at step 302. Several variables are initialized at step 304. A frame index or pointer (N) is initialized to zero. In addition, a DTS addition variable (DTS_ADD) and a PTS addition variable (PTS_ADD) are initialized to zero. The DTS and PTS addition variables are used to accumulate the DTM and PTS errors due to frame adds so that these errors may be corrected by recalculating the DTS and PTS parameters of frames following the added frame(s). An add rate (ADD_RATE) is initialized to four, indicating that a frame should be added after every fourth I-frame. The add rate may be predetermined or may be modified by, e.g., the decision source 130 of FIG. 1. An "addable" frame (i.e., I-frame) counter (ADD_NUM) is also initialized to zero.

The frame index and add number are incremented in step 306 and the $N^{th}$ frame is read in a known manner in step 308. Step 310 queries whether frame(N) is an I-frame. If the query at step 310 is negatively answered, the routine 300 proceeds to step 314. If the query at step 310 is affirmatively answered, the routine 300 proceeds along a YES path to step 316.

Step 316 queries whether the add rate variable (ADD_RATE) is greater than, or equal to, the add number (ADD_NUM) variable. If the answer to this query is affirmatively answered (i.e., if frame(N) is not at least the fourth I-frame since the last frame add) then the routine 300 proceeds along the YES path to step 306. If the query at step 316 is negatively answered, then the routine 300 proceeds to step 318, where $B_{PP}$ is calculated in the same manner as previously described with respect to step 218 of the drop routine 200 of FIG. 2. After step 318 the routine 300 proceeds to step 322.

If a frame is not to be added after frame(N), then the routine proceeds to step 314. At step 314 the PTS, DTS and picture header of frame(N) are adjusted to compensate for timing discontinuities caused by the adding of any preceding frames. The routine then proceeds to step 306.

If a frame is to be added after frame(N), then, at step 322 the routine 300 calculates a stuffing value (B_STUFF=$B_{PP}$−T(ADD)), stuffs the frame to be added with the number of zeros calculated as the stuffing value, and adjusts the DTS and PTS addition accumulators. The routine 200 then proceeds to step 324.

At step 324, the frame to be added is stuffed with the appropriate number of zeros and inserted into the bitstream as the frame immediately following (in bitstream order) the $N^{th}$ frame, and the add number variable is reduced by the add rate variable. The DTS, PTS and picture header of the N+1 frame are then adjusted at step 314. It should be noted that the added frame will use the DTS, PTS and VBV parameter of frame N+1. Therefore, frame N+1 and every frame following an added frame will need to be adjusted.

The routine 300 of FIG. 3 may be easily modified in the same manner as the routine of FIG. 2 (i.e., optional steps 204, 209, 211, 213, 215 and 227) to operate as a frame rate converter. In the case of the routine 300 of FIG. 3, a frame rate conversion of, e.g., 59.94 fps to 60 fps may be effected by adding a frame each time 1001 frames are read.

Audio Considerations

If a Transport Stream contains audio data corresponding to the video data, an appropriate amount of audio data must be removed from the stream so that the running time of the audio and video match (i.e., "lip sync" is preserved). Consequently, audio frames must be dropped along with video frames. However, since audio frames and video frames do not usually represent equal periods of time, there is not a one-to-one correspondence between dropped video frames and audio frames. For example, ATSC audio frames are 32 milliseconds long, while a 30 frame/sec video frame is 33 milliseconds long. Thus, more audio frames will be removed than video frames on average.

In the above ATSC audio example, the lip sync will drift up to one audio frame time as audio frames are removed. This may be remedied by adjusting the PTS time stamps in the audio PES stream header to instruct the decoder as to when that audio frame should be played.

In the case of video frame adding, it is recommended that audio frames not be added. Rather, the audio frames should periodically be PTS-adjusted to ensure proper lip sync.

Constraining Bitstreams During Bitstream Construction

To reduce the amount of processing required to perform the above-described frame drop and frame add operations, a bitstream may be constrained during its construction. To enable the invention to easily identify droppable frames, a bitstream may be constructed with droppable frames tagged or marked in some manner. An identifying syntax may be inserted into the bitstream and associated with the droppable frame or a frame preceding or following the droppable frame. Moreover, the droppable frames may be bit-size constrained to ensure that the number of bits in a droppable frame N is greater than or equal to the number of bits that enter the VBV buffer before the next frame is decoded (i.e., $T_N > B_{PP}$). By constructing a bitstream with identified and bitcount-constrained droppable frames, the task of identifying a droppable frame and the associated circuitry and/or software is greatly simplified. These constraints, and the previously-described methods, are applicable to each of the several levels of MPEG layering, including Elementary Stream, Packetized Elementary Stream (PES), Transport Stream and Program Stream layers.

In the case of an elementary bitstream, one possible syntax uses readily available fields within an MPEG compliant stream to mark a droppable frame, e.g., use one byte of "user_data" following the "picture-coding-extension", with the value of "user_data" set to a unique value, such as 0x2a.

Similarly, the case of a PES stream, one possible syntax sets the PES_private_data field of the droppable frame's PES header to a unique value such as the hexadecimal sequence "44 72 6F 70 70 61 62 6C 65 20 46 72 61 6D 65 00," which represents the ASCII codes for the words "Droppable Frame".

In the case of a transport bitstream, one possible syntax uses one byte of "transport_private_data" in the adaptation-field( ), with the value of "private_data_byte" set to a unique value such as 0x2a.

An example of the utility of the above constraints will now be described. Assume that a bitstream is constructed with a regular pattern of frame types (i.e., a group of pictures or GOP) as follows:

. . . IbbpbbpbbpbbpBbIbbpbbpbbpbbpBbIbbpbbp-bbpbbpBb . . .

The exemplary GOP includes 15 frames as follows: every $15^{th}$ frame is an I-frame, every $3^{rd}$ frame after each I frame that is not a $15^{th}$ frame, is a P frame. All other frames are B frames (i.e., N=15, M=3). One B frame in each 15 frame set is constrained as above, that is, it contains more bits than will enter the VBV before the next picture is decoded (stuffing bits can be used to assure this). The droppable B-frame is capitalized in the foregoing sequence.

FIG. 6 is a flowchart of an adjustable rate, frame dropping routine 600 according to the invention and suitable for processing the above-described constrained bitstream. It should be noted that since the routine 600 of FIG. 6 is very similar to the routine 200 of FIG. 2, only differences between the two routines will be described. For example, steps 202–208, 214–218, and 222–226 of FIG. 2 are identical to, respectively, steps 602–608, 614–618, and 622–626 of FIG. 6.

In FIG. 6, step 615 is an examination of the bitstream to determine if the syntax identifying frame N as a droppable frame is present within the bitstream. If the syntax is not present, then step 614 is performed. If the syntax is present then steps 618–626 are performed. It should be noted that the routine 600 of FIG. 6 has no steps corresponding to steps 210, 212 and 220 of routine 200 of FIG. 2. Thus, the circuitry and/or software required to implement these steps is not necessary.

It will be recognized by those skilled in the art that the teachings of FIG. 6 may be used to create a frame adding routine suitable for processing the above-described constrained bitstream.

Although various embodiments which incorporate the teachings of the present invention have been shown and described in detail herein, those skilled in the art can readily devise many other varied embodiments that still incorporate these teachings.

What is claimed is:

1. A method for processing an MPEG-like bitstream, said bitstream comprising information frames having associated timing information, said method comprising the steps of:

examining, in bitstream order, the information frames in said bitstream;

identifying non-referential information frames containing at least a threshold number of bits;

removing at least one of said non-referential information frames from said bitstream; and modifying timing information associated with one or more information frames following, in bitstream order, said at least one removed non-referential information frame; wherein said timing information comprises a time stamp, and said step of modifying comprises the steps of:

adding said time stamp associated with each removed non-referential information frame to a time stamp error accumulator; and subtracting said accumulated time stamp error from said time stamp associated with each information frame following, in bitstream order, said removed non-referential information frame.

2. The method of claim 1, wherein said time stamp comprises at least one of a presentation time stamp (PTS), a decode time stamp (DTS) and a program clock reference (PCR).

3. The method of claim 1, wherein said MPEG-like bitstream is a constant bitrate stream, and wherein:

said step of removing further comprises the step of:

calculating the number of bits in each removed non-referential information frame; and said step of modifying further comprises the step of:

stuffing, with said calculated number of bits, the information frame immediately following, in bitstream order, said removed non-referential information frame.

4. The method of claim 1, wherein step of removing comprises the steps of:

counting the number of identified non-referential information frames containing at least a threshold number of bits;

removing every $N^{th}$ identified non-referential information frame containing at least a threshold number of bits, where N is one of a predetermined number and a programmable number.

5. The method of claim 1, wherein said step of examining comprises the steps of:

counting the number of information frames in said MPEG-like bitstream; and proceeding to said step of identifying only after the $M^{th}$ frame is counted, where M is one of a predetermined number and a programmable number.

6. The method of claim 1, wherein said step of identifying comprises the step of identifying those information frames have associated with them a predefined syntax.

7. The method of claim 6, wherein said predefined syntax is located in at least one of an elementary stream layer, a packetized elementary stream layer and a transport stream layer.

8. The method of claim 6, wherein said predefined syntax comprises a unique data sequence within at least one of a user data field following a picture coding extension, a packetized elementary stream private data field and a transport stream private data field.

9. The method of claim 1, wherein said information frames comprise video frames having associated with them audio frames, said video frames and said audio frames for presenting respective video and audio information in a substantially synchronous manner according to respective presentation time stamps, said method further comprising the step of:

removing, from said bitstream, those audio frames that are substantially synchronized to each removed at least one of said non-referential information frame.

10. A method for processing an MPEG-like bitstream, said bitstream comprising information frames having associated timing information, said method comprising the steps of:

examining, in bitstream order, the information frames in said bitstream;

identifying information frames of a predetermined type;

inserting into said bitstream, after at least one of said identified information frames, an information frame causing said identified information frame to be repeated in a decoder;

modifying the timing information associated with one or more information frames following, in bitstream order, said inserted information frame.

11. The method of claim 10, wherein said timing information comprises a time stamp, and said step of modifying comprises the steps of:

adding said time stamp associated with each identified frame to be repeated to a time stamp error accumulator; and adding said accumulated time stamp error to each information frame following, in bitstream order, said identified frame to be repeated.

12. The method of claim 11, wherein said time stamp comprises at least one of a presentation time stamp (PTS), a decode time stamp (DTS) and a program clock reference (PCR).

13. The method of claim 12, wherein said MPEG-like bitstream is a constant bitrate stream, and wherein said step of inserting further comprises the steps of:

calculating the number of bits in each identified information frame to be repeated; and stuffing said information frame to be added with bits until said information frame to be added includes said calculated number of bits.

14. The method of claim 10, wherein said step of inserting comprises the steps of:
   counting the number of identified information frames of a predetermined type; and
   inserting, after every $N^{th}$ identified information frame of a predetermined type, an information frame causing said identified information frame to be repeated in a decoder, where N is one of a predetermined number and a programmable number.

15. The method of claim 10, wherein said step of identifying comprises the step of identifying those information frames have associated with them a predefined syntax.

16. The method of claim 15, wherein said predefined syntax is located in at least one of an elementary stream layer, a packetized elementary stream layer and a transport stream layer.

17. The method of claim 15, wherein said predefined syntax comprises a unique data sequence within at least one of a user data field following a picture coding extension, a packetized elementary stream private data field and a transport stream private data field.

18. The method of claim 10, wherein said information frames comprise video frames having associated with them audio frames, said video frames and said audio frames for presenting respective video and audio information in a substantially synchronous manner according to respective presentation time stamps, said method further comprising the step of:
   periodically adjusting said presentation time stamps of said audio frames to ensure proper synchronization between said video frames and said audio frames.

19. Apparatus for processing an MPEG-like bitstream, said bitstream comprising information frames having associated timing information, said apparatus comprising:
   an input/output circuit, receiving said MPEG-like bitstream at an input and providing a processed MPEG-like bitstream at an output; and
   a microprocessor, coupled to said input/output circuit and to a memory circuit, for examining said MPEGlike bitstream, and for identifying non-referential information frames containing at least a threshold number of bits;
   said microprocessor removing at least one of said non-referential information frames from said MPEGlike bitstream; and
   said microprocessor modifying timing information associated with one or more information frames following, in bitstream order, said at least one removed non-referential information frame.

20. The apparatus of claim 19, wherein said timing information comprises a time stamp, and wherein:
   said microprocessor adds said time stamp associated with each removed non-referential information frame to a time stamp error accumulator; and
   said microprocessor subtracts said accumulated time stamp error from said time stamp associated with each information frame following, in bitstream order, said removed non-referential information frame.

21. The apparatus of claim 20, wherein said time stamp comprises at least one of a presentation time stamp (PTS), a decode time stamp (DTS) and a program clock reference (PCR).

22. The apparatus of claim 19, wherein said MPEG-like bitstream is a constant bitrate stream, and wherein said microprocessor calculates the number of bits in each removed non-referential information frame and stuffs, with said calculated number of bits, the information frame immediately following, in bitstream order, said removed non-referential information frame.

23. The apparatus of claim 19, wherein said microprocessor counts the number of identified non-referential information frames containing at least a threshold number of bits and removes every $N^{th}$ identified non-referential information frame containing at least a threshold number of bits, where N is one of a predetermined number and a programmable number.

24. The apparatus of claim 19, wherein said microprocessor counts M information frames in said MPEG-like bitstream prior to identifying non-referential information frames containing at least a threshold number of bits, where M is one of a predetermined number and a programmable number.

25. The apparatus of claim 19, wherein said microprocessor identifies indicia of a video buffering verifier (VBV) trajectory and, in response to said identified indicia, modifies said timing information of said one or more information frames following, in bitstream order, said at least one removed non-referential information frame.

26. The apparatus of claim 19, wherein said microprocessor selectively adds information frames to said MPEG-like bitstream and, upon adding a frame to said MPEG-like bitstream, modifies timing information associated with one or more information frames following, in bitstream order, said added frame.

27. The apparatus of claim 26, wherein said information frames comprise video frames having associated with them audio frames, said video frames and said audio frames for presenting respective video and audio information in a substantially synchronous manner according to respective presentation time stamps, and wherein:
   said microprocessor periodically adjusts said presentation time stamps of said audio frames to ensure proper synchronization between said video frames and said audio frames.

28. The apparatus of claim 26, wherein said added frame causes a frame immediately preceding said added frame, in bitstream order, to be repeated.

29. The apparatus of claim 12, wherein said microprocessor identifies said non-referential information frames containing at least a threshold number of bits by utilizing a predefined syntax within said MPEG-like bitstream.

30. The apparatus of claim 29, wherein said predefined syntax is located in at least one of an elementary stream layer, a packetized elementary stream layer and a transport stream layer.

31. The apparatus of claim 29, wherein said predefined syntax comprises a unique data sequence within at least one of a user data field following a picture coding extension, a packetized elementary stream private data field and a transport stream private data field.

32. The apparatus of claim 12, wherein said information frames comprise video frames having associated with them audio frames, said video frames and said audio frames for presenting respective video and audio information in a substantially synchronous manner according to respective presentation time stamps, and wherein:
   said microprocessor periodically removes, from said bitstream, those audio frames that are substantially synchronized to each removed at least one of said non-referential information frame.

\* \* \* \* \*